United States Patent
Yanagisawa et al.

(10) Patent No.: US 7,924,390 B2
(45) Date of Patent: Apr. 12, 2011

(54) DISPLAY DEVICE

(75) Inventors: Syou Yanagisawa, Mobara (JP);
Nobuyuki Ishige, Shirako (JP)

(73) Assignee: Hitachi Displays, Ltd., Chiba (JP)

( * ) Notice: Subject to any disclaimer, the term of this patent is extended or adjusted under 35 U.S.C. 154(b) by 327 days.

(21) Appl. No.: 12/314,843

(22) Filed: Dec. 17, 2008

(65) Prior Publication Data

US 2009/0153008 A1    Jun. 18, 2009

(30) Foreign Application Priority Data

Dec. 18, 2007 (JP) ................................. 2007-326066

(51) Int. Cl.
*G02F 1/1345* (2006.01)
*G02F 1/1333* (2006.01)
*H01L 29/04* (2006.01)
*H01J 1/62* (2006.01)
*H01J 5/50* (2006.01)
*G02F 1/136* (2006.01)

(52) U.S. Cl. ............... 349/152; 349/43; 349/54; 257/59

(58) Field of Classification Search .................... 349/43, 349/54, 84, 92, 149–152; 362/375; 257/59, 257/66, 72, 737, E23.021; 313/51, 498; 345/213
See application file for complete search history.

(56) References Cited

U.S. PATENT DOCUMENTS

| 5,949,502 | A  | * | 9/1999 | Matsunaga et al. ............. 349/40 |
| 6,590,624 | B1 |   | 7/2003 | Lee |
| 7,297,979 | B2 |   | 11/2007 | Lim et al. |
| 7,304,710 | B2 |   | 12/2007 | Ishige et al. |
| 7,349,054 | B2 | * | 3/2008 | Kohtaka .......................... 349/150 |
| 7,503,026 | B2 | * | 3/2009 | Ichiryu et al. .................. 716/130 |
| 7,760,281 | B2 | * | 7/2010 | Tanabe et al. .................... 349/43 |
| 2002/0105263 | A1 |   | 8/2002 | Kim |
| 2003/0122989 | A1 |   | 7/2003 | Park et al. |
| 2004/0239863 | A1 | * | 12/2004 | Liou et al. ..................... 349/152 |
| 2007/0045516 | A1 |   | 3/2007 | Hong |
| 2008/0001885 | A1 |   | 1/2008 | Yanagisawa et al. |
| 2008/0049171 | A1 |   | 2/2008 | Takahashi |
| 2008/0100599 | A1 | * | 5/2008 | Kinoshita ..................... 345/204 |

FOREIGN PATENT DOCUMENTS

| CN | 1629704 A   | 6/2005 |
| JP | 2004-053702 | 7/2002 |
| JP | 2008-009246 | 6/2006 |
| JP | 2008-020791 | 7/2006 |

OTHER PUBLICATIONS

Office Action from Chinese Patent Office for 200810187150.2 mailed May 19, 2010.
Extended European Search Report, Dated Jul. 15, 2009.

* cited by examiner

*Primary Examiner* — Akm E Ullah
(74) *Attorney, Agent, or Firm* — Stites & Harbison PLLC; Juan Carlos A. Marquez, Esq.

(57) ABSTRACT

A terminal includes a first part, which includes a terminal contact hole and an ITO film, and a second part, which includes the ITO film but not the contact hole. A terminal wiring line of the terminal is wide in the first part and narrow in the second part. In regions adjacent to the first part, adjacent terminal wiring lines are bent outward, thus securing enough interval between wiring lines, with the result that terminals can be formed through patterning by normal light exposure.

18 Claims, 7 Drawing Sheets

A - A

A – A

B – B

C – C

D – D

A - A

A – A

B – B

C – C

DISPLAY DEVICE

CROSS-REFERENCE TO RELATED APPLICATION

The present application claims priority from Japanese application JP 2007-326066 filed on Dec. 18, 2007, the content of which is hereby incorporated by reference into this application.

BACKGROUND OF THE INVENTION

1. Field of the Invention

The present invention relates to a display device, and more particularly, to a technique of connecting terminals to an IC driver or the like when the terminal pitch is small due to the reduced size of the display device, or enhanced screen resolution, or the reduced size of the IC driver.

2. Description of the Related Art

In liquid crystal displays, a liquid crystal is held between a TFT substrate and an opposite substrate, with pixel electrodes, thin-film transistors (TFTs), and others formed into a matrix pattern on the TFT substrate and pigment dots of a color filter and others formed on the opposite substrate in places that correspond to the locations of the pixel electrodes. Liquid crystal displays form an image by controlling the light transmittance for each pixel separately by controlling liquid crystal molecules.

Multiple video signal lines running in the longitudinal direction of the TFT substrate are arranged in the lateral direction of the TFT substrate, whereas multiple scanning lines running in the lateral direction of the TFT substrate are arranged in the longitudinal direction of the TFT substrate. A pixel is formed in a region enclosed by the video signal lines and the scanning lines. The major components of each pixel are a pixel electrode and a thin-film transistor (TFT), which is a switching element. Numerous pixels formed into a matrix pattern in this manner constitute a display area. In the display area of the TFT substrate, TFTs are formed first, then an inorganic passivation film is formed on the TFTs, and pixel electrodes are formed on the passivation film. An insulating film such as an SiN film is used as the inorganic passivation film, and a transparent conductive film such as an ITO film is used as the pixel electrodes.

Components formed outside the display area of the TFT substrate include a group of terminals for supplying video signals to the video signal lines and a group of terminals for supplying scanning signals to the scanning lines. Bumps formed in an IC driver (driver chip) are connected to these terminal groups. As the screen resolution is higher, more terminals are connected to the IC driver and the pitch between terminals is smaller. A reduction in bump pitch as a result of the downsizing of the IC driver also contributes to a narrower terminal pitch. With the terminal pitch reduced, securing enough area for connecting the terminals to the bumps formed in the IC driver is difficult. Japanese Patent Application No. 2006-193987 (Japanese Patent Application Laid-open 2008-20791) describes a structure in which, when the wiring pitch is smaller than the bump pitch of an IC driver, the bump pitch and the wiring pitch are made compatible with each other by connecting wiring lines and bumps in several stages.

When a display device is reduced in size causing a framing area around the display area to be smaller, lead-out lines of scanning lines, in particular, are gathered to one side of the display device. If all the lead-out lines of scanning lines are to be laid on a single plane in this case, a large area is needed. In order to avoid this problem, leading out the lead-out lines of scanning lines three dimensionally through an insulating layer requires less area for the lead-out lines of scanning lines. This structure is described in, for example, Japanese Patent Application Laid-open 2004-053702.

In the process of manufacturing a liquid crystal display device, the step of assembling a liquid crystal display panel includes checking for short circuit and other defects in wiring lines that are formed on the liquid crystal display panel before an IC driver is installed in the liquid crystal display panel. If short circuit and other wiring defects are found at this stage, there is no sense in performing the subsequent steps on the defective liquid crystal display panel, and the manufacturing cost can thus be lowered. TFT switches and the like are therefore placed in an area that is outside the display area and that is close to terminals to be connected to the IC driver. A liquid crystal display device structure as this that allows for the checking step is described in Japanese Patent Application No. 2006-181249 (Japanese Patent Application Laid-open 2008-9246).

Further enhancement of the display device resolution, narrowing of the frame, and downsizing of IC drivers will make the wiling pitch even smaller. In liquid crystal and other display devices, wiring lines outside the display area are covered with an insulating film such as the passivation film as a protection against the outside air. The wiring lines, however, need to be exposed in places where the wiring lines are connected to the bumps of the IC driver or the like, by forming contact holes in the insulating film. The contact holes are covered with a transparent conductive film that is chemically stable, for example, an ITO film, in order to avoid the corrosion of the wiring lines in the contact holes.

A given area is necessary to form a contact hole. Also, a given contact area is needed in order to ensure a reliable connection between a terminal and a bump. The enough era for the contact holes or the contact area for the bump-terminal connection can be secured by arranging the terminals in a staggered pattern, or by arranging the terminals in rows as described in Japanese Patent Application No. 2006-193987 (Japanese Patent Application Laid-open 2008-20791). However, arranging the terminals in these manners narrows the areas of other wiring lines running in parallel to the wiring lines of the terminals, possibly to a degree that makes the wiring width and the wiring interval smaller than the precision of wiring machining.

SUMMARY OF THE INVENTION

An object of the present invention is to ensure that wiring lines can be patterned even when the wiring pitch is small due to the reduced size of a display device or an IC driver and to high resolution, while securing an area for terminals to be connected to the IC driver and a given area for contact holes in the terminals.

A main measure of the present invention to attain the above-mentioned object is to compose a single terminal from a first part, which has a contact hole formed above a wiring line of the terminal as well as a transparent conductive film covering the contact hole and connected to the terminal wiring line, and a second part, which has the transparent conductive film but not the contact hole. Also, the wiring width of the terminal line is set wide in the first part and narrow in the second part. In regions adjacent to the first part, the wiring width of adjacent terminal wiring lines is set narrower than that of the terminal wiring line in question in the first part, and the adjacent terminal wiring lines are bent away from the first part. The wiring interval is thus widened enough for micromachining. Specifics of the measure are as follows:

(1) A display device including:

a display area in which multiple scanning lines, multiple video signal lines, and multiple pixels are formed, the multiple video signal lines intersecting the multiple scanning lines; and a terminal group which is placed outside the display area, in which the terminal group includes multiple terminals which supply signals through a terminal wiring line to any one of the multiple scanning lines and the multiple video signal lines, in which the multiple terminals each include a first part and a second part, which is adjacent to the first part in a running direction of the terminal wiring line, in which the first part includes a contact hole, which is formed above the terminal wiring line, and a transparent conductive film, which covers the contact hole to connect to the terminal wiring line, in which the second part includes the transparent conductive film but not the contact hole, in which the terminal wiring line is wider in the first part than in the second part, and in which, in regions adjacent to the first part, other terminal wiring lines that are adjacent to the terminal wiring line have a wiring width narrower than a width of the terminal wiring line in the first part, and are bent away from the first part.

(2) In the display device according to Item (1), one bump formed in an IC driver is connected to the first part of one of the multiple terminals, and to the second part of the one of the multiple terminals both in an overlapping manner.

(3) In the display device according to Item (1) or (2), the terminal group includes a terminal in which the first part is placed closer to the display area than the second part is and a terminal in which the second part is placed closer to the display area than the first part is.

(4) In the display device according to any one of Items (1) to (3), the terminal wiring line and the other terminal wiring lines that are adjacent to the terminal wiring line are formed in the same layer.

(5) In the display device according to any one of Items (1) to (4), the multiple pixels formed in the display area each include a thin-film transistor, and the terminal wiring line is formed from a gate metal layer, which is the same layer and material used to form a gate electrode of the thin-film transistor in the display area.

(6) In the display device according to any one of Items (1) to (5), the transparent conductive film of the multiple terminals is wider in the first part than in the second part.

(7) A display device including:

a display area in which multiple scanning lines, multiple video signal lines, and multiple pixels are formed, the multiple video signal lines intersecting the multiple scanning lines;

a terminal group which is placed outside the display area;

a test thin-film transistor which is connected to the terminal group; and a test wiring line, in which the terminal group includes multiple terminals which supply signals through a terminal wiring line to any one of the multiple scanning lines and the multiple video signal lines, in which the multiple terminals each include a first part and a second part, which is adjacent to the first part in a running direction of the terminal wiring line, in which the terminal wiring line includes a first terminal wiring line and a second terminal wiring line, which is formed in a layer different from a layer where the first terminal wiring line is formed, in which the first part includes a first contact hole, which is formed above the first terminal wiring line, a second contact hole, which is formed above the second terminal wiring line, and a transparent conductive film, which covers the first contact hole and the second contact hole to connect to the first terminal wiring line and the second terminal wiring line, in which the second part includes the transparent conductive film but not the first contact hole or the second contact hole, in which the terminal wiring line is wider in the first part than in the second part, in which, in regions adjacent to the first part, other terminal wiring lines that are adjacent to the terminal wiring line have a wiring width narrower than a width of the terminal wiring line in the first part, and are bent away from the first part, in which, in the first part, the first terminal wiring line switches over to the second terminal wiring line through the first contact hole, the second contact hole, and the transparent conductive film, and in which the second terminal wiring line is connected to one of a source electrode and a drain electrode of the test thin-film transistor.

(8) In the display device according to Item (7), one bump formed in an IC driver is connected to the first contact hole and the second contact hole in the first part of one of the multiple terminals, and to the second part of the one of the multiple terminals both in an overlapping manner.

(9) In the display device according to Item (7) or (8), the terminal group includes a terminal in which the first part is placed closer to the display area than the second part is and a terminal in which the second part is placed closer to the display area than the first part is.

(10) In the display device according to any one of Items (7) to (9), the multiple pixels formed in the display area each include a thin-film transistor, and the first terminal wiring line is formed from a gate metal layer, which is the same layer and material used to form a gate electrode of the thin-film transistor in the display area.

(11) In the display device according to Item (10), the second terminal wiring line is formed from an SD metal layer, which is the same layer and material used to form the source electrode and the drain electrode of the thin-film transistor in the display area.

(12) In the display device according to Item (11), the terminal wiring line formed from the SD metal layer constitutes one of the source electrode and the drain electrode of the test thin-film transistor.

(13) In the display device according to any one of Items (7) to (12), the transparent conductive film of the multiple terminals is wider in the first part than in the second part.

(14) A display device including:

a display area in which multiple scanning lines, multiple video signal lines, and multiple pixels are formed, the multiple video signal lines intersecting the multiple scanning lines;

a terminal group which is placed outside the display area;

a test thin-film transistor which is connected to the terminal group; and a test wiring line, in which the terminal group includes multiple terminals which supply signals through a terminal wiring line to any one of the multiple scanning lines and the multiple video signal lines, in which the multiple terminals each include a first part and a second part, which is adjacent to the first part in a running direction of the terminal wiring line, in which the terminal wiring line includes a first terminal wiring line and a second terminal wiring line, which is formed in a layer different from a layer where the first terminal wiring line is formed, in which the first part includes a first contact hole, which is formed above the first terminal wiring line, a second contact hole, which is formed above the second terminal wiring line, and a transparent conductive film, which covers the first contact hole and the second contact hole to connect to the first terminal wiring line and the second terminal wiring line, in which the second part includes the transparent conductive film but not the first contact hole or the second contact hole, in which the terminal wiring line is wider in the first part than in the second part, in which, in regions adjacent to the first part, other terminal wiring lines that are adjacent to the terminal wiring line have a wiring width narrower than a width of the terminal wiring line in the first part, and are bent away from the first part, in which, in the first part, the first terminal wiring line switches over to the second terminal wiring line through the first contact hole, the second contact hole, and the transparent conductive film, in which every two adjacent terminal wiring lines are formed in different layers, which are separated by an insulating film, in a region between the terminal group and the display area, in which, when the first terminal wiring line of one terminal wiring line is located between the display area and the first part of one of the multiple terminals with which this terminal wiring line is associated, this terminal wiring line switches over to the second terminal wiring line in the first part to be connected to one of a source electrode and a drain electrode of the test thin-film transistor, and in which, when the second terminal wiring line of one terminal wiring line is located between the display area and the first part of one of the multiple terminals with which this terminal wiring line is associated, this terminal wiring line switches over to the first terminal wiring line in the first part, and switches over back to the second terminal wiring line via a switchover terminal in a region between the first part and the test thin-film transistor to be connected to one of the source electrode and the drain electrode of the test thin-film transistor, the switchover terminal including a through hole.

(15) In the display device according to Item (14), one bump formed in an IC driver is connected to the first contact hole and the second contact hole in the first part of one of the multiple terminals, and to the second part of the one of the multiple terminals both in an overlapping manner.

(16) In the display device according to Item (14) or (15), the terminal group includes a terminal in which the first part is placed closer to the display area than the second part is and a terminal in which the second part is placed closer to the display area than the first part is.

(17) In the display device according to any one of Items (14) to (16), the multiple pixels formed in the display area each include a thin-film transistor, the first terminal wiring line is formed from a gate metal layer, which is the same layer and material used to form a gate electrode of the thin-film transistor in the display area, and the second terminal wiring line is formed from an SD metal layer, which is the same layer and material used to form the source electrode and the drain electrode of the thin-film transistor in the display area.

(18) In the display device according to any one of Items (14) to (17), a number of the switchover terminals is half a number of the terminal wiring lines.

According to the present invention, a single terminal is divided into a first part in which a contact hole is formed and a second part in which no contact hole is formed, and the width of a wiring line of the terminal is set wide only in the first part where a contact hole is formed. Beside, in the first part, adjacent terminal wiring lines are bent away from the wide terminal wiring line, and hence a larger interval can be set between wiring lines at the same wiring pitch. Micromachining by light exposure can thus be performed at a smaller wiring pitch.

This means that the pixel pitch can be reduced for higher screen resolution and that a display device can have smaller outside dimensions. Also, an IC driver with a reduced bump pitch can be installed in a display device.

DETAILED DESCRIPTION OF THE INVENTION

Before a description is given on a specific terminal structure of the present invention, a liquid crystal display device to which the present invention is applied and the structure of a part of the liquid crystal display device where terminals are located (terminal part) are described. Though the description herein takes a liquid crystal display device as an example, the present invention is also applicable to other types of display device such as organic EL display devices.

Figure 5:
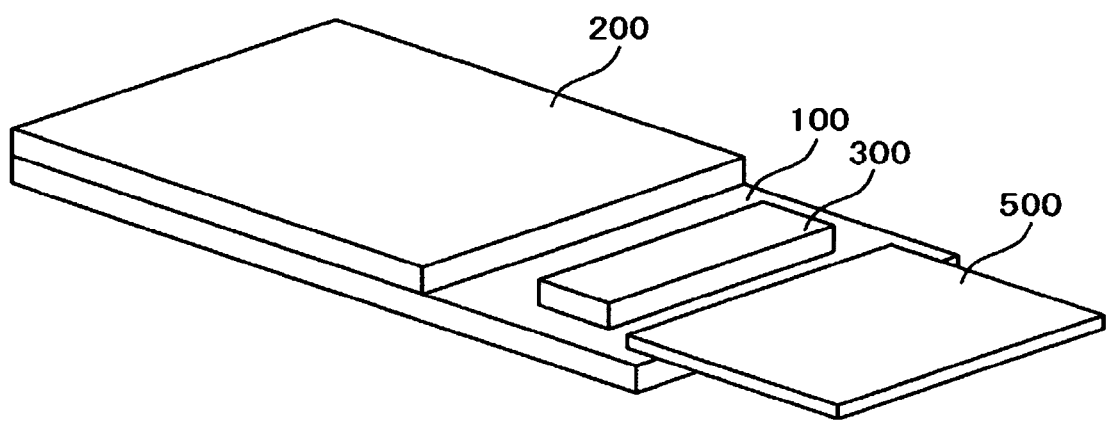
FIG. 5 is an outline drawing of a display device.

FIG. 5 illustrates an example of a liquid crystal display device to which the present invention is applied. FIG. 5 illustrates a small-sized liquid crystal display device used for a mobile phone and the like. In FIG. 5, an opposite substrate 200 is laid on a TFT substrate 100 where pixel electrodes, thin-film transistors (TFTs), and others are formed into a matrix pattern. A color filter is formed on the opposite substrate 200, with pigment dots of the color filter in places that correspond to the locations of the pixel electrodes, to enable the liquid crystal display device to form color images. A liquid crystal layer is held between the TFT substrate 100 and the opposite substrate 200. The TFT substrate 100 and the opposite substrate 200 constitute a display area.

Part of the TFT substrate 100 is not covered with the opposite substrate 200, and the exposed part of the TFT substrate 100 has an IC driver 300, which is installed to drive the liquid crystal display device, and a flexible wiring board 500, which is installed to supply power, signals, and the like from the outside. The IC driver 300 is, as illustrated in FIG. 6, connected through an anisotropic conductive film 400 to terminals 10, which are formed on the TFT substrate 100.

Figure 6:
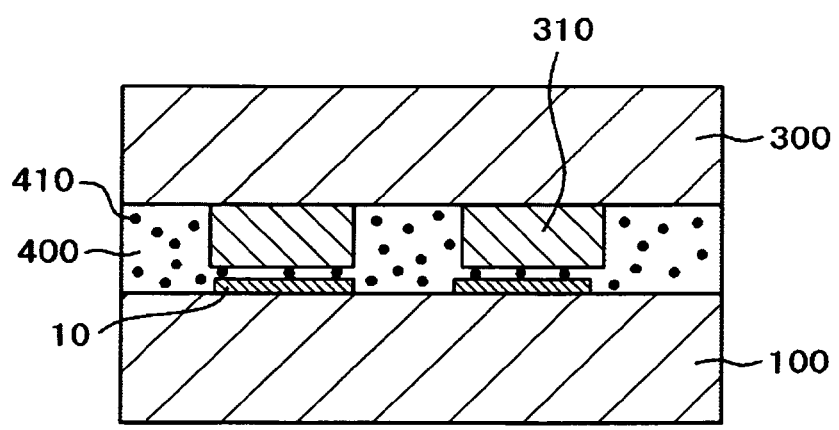
FIG. 6 is a sectional view illustrating connection with an IC driver.

In FIG. 6, the terminals 10 are formed on the TFT substrate 100. A terminal includes a wiring metal layer, a contact hole, a transparent conductive film (e.g., ITO film), and others, which are omitted from FIG. 6. The IC driver 300 connects to the terminals 10 by means of bumps 310 formed thereon, and the bumps 310 are connected to the terminals 10 formed on the TFT substrate 100. The connection between the bumps 310 and the terminals 10 is made through the anisotropic conductive film 400.

The anisotropic conductive film 400 is a resin film in which conductive particles 410 are dispersed. When the IC driver 300 and the TFT substrate 100 are press-fit, the bumps 310 and the terminals 10 are electrically connected through the conductive particles 410. On the other hand, there is no electrical conduction in the lateral direction of FIG. 6 because the conductive particles 410 are spaced apart from one another.

The display device to which the present invention is applied thus has multiple scanning lines, multiple video signal lines, which intersect the multiple scanning lines, a display area, where multiple pixels are formed, and a terminal group, which is placed outside the display area. The terminal group has the multiple terminals 10, which supply signals to any one of the multiple scanning lines and the multiple video signal lines through terminal wiring lines.

Figure 7A:
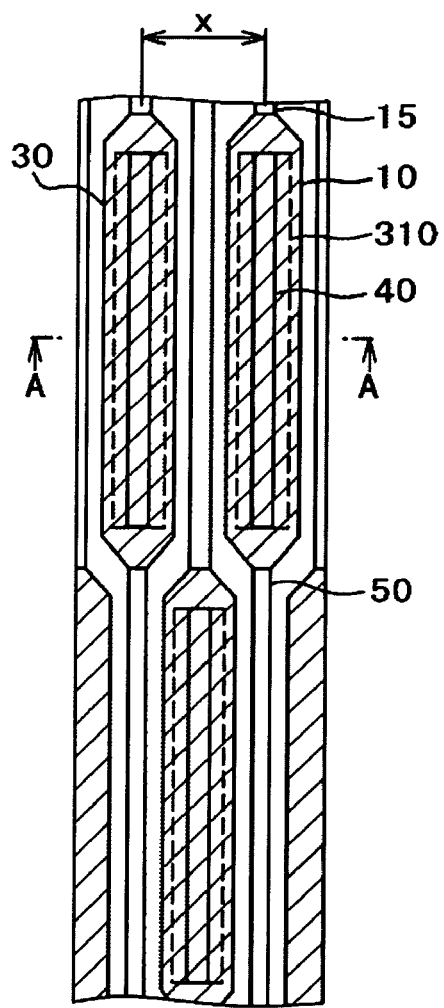
FIGS. 7A and 7B are diagrams illustrating an example of the terminal structure.
Figure 7B:
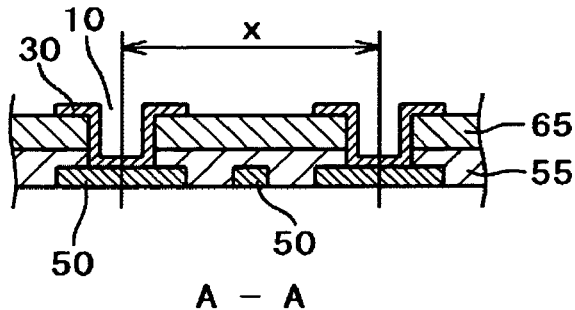

FIGS. 7A and 7B are detailed diagrams of a part of the TFT substrate 100 where terminals are formed (hereinafter referred to as terminal part). FIG. 7A is a plan view of the terminal part. The display area is located above FIG. 7A and an end of the TFT substrate 100 is below FIG. 7A. FIG. 7B is a sectional view taken along the line A-A of FIG. 7A. The terminals 10 of FIG. 7A are arranged in a staggered pattern since the wiring pitch is small. A pitch x between two terminals 10 that are adjacent to each other in the lateral direction of FIGS. 7A and 7B is 36 μm. In FIG. 7A, a gate metal layer 50 serves as lower terminal wiring lines 15. The gate metal layer 50 is named so because it uses the same metal as a layer that forms gate electrodes of the TFTs or gate wiring lines in the display area. The scanning lines are also formed from the gate metal layer 50. Mo, for example, is employed for the gate metal layer 50. The gate metal layer 50 is wider in the part where the terminals 10 are formed than the wiring parts which precede and follow the terminal part so that a contact hole 40 can be formed. The gate metal layer 50 is covered with a gate insulating film 55 as illustrated in FIG. 7B. A passivation film 65 formed on the gate insulating film 55 further adds another layer. These insulating films are used to protect the gate metal layer 50.

As illustrated in FIG. 7B, the contact hole 40 is formed in the gate insulating film 55 and the passivation film 65 to expose the gate metal layer 50. The exposed gate metal layer 50 is covered with an ITO film 30, which is a transparent conductive film. The ITO film 30 is provided to protect the gate metal layer 50 and to connect with the bumps 310 of the IC driver 300, and is formed wider than the contact hole 40. This embodiment employs an ITO film as a transparent conductive film but other transparent conductive films than an ITO film may be used instead. Hatched regions of FIG. 7A represent the ITO film 30. The shape of the contact hole 40 in plan view is oblong as illustrated in FIG. 7A.

Regions where the bumps 310 of the IC driver 300 are placed are indicated by the dotted lines in FIG. 7A. The bumps 310 have substantially the same shape as the ITO film 30, though slightly smaller. The bumps 310 are omitted from FIG. 7B.

This structure allows for machining when the pitch x between adjacent terminals illustrated in FIGS. 7A and 7B is about 36 μm. Assuming that the width of the gate metal layer 50 in the terminal part is 20 μm, the interval between two adjacent terminals 10 in the upper row of the staggered pattern is 16 μm, and one terminal wiring line 15 runs between the two adjacent terminals 10 spaced 16 μm apart. Accordingly, about 5.3 μm can be spared for the wiring width and the wiring interval, each, of the gate metal layer 50 that is located between the two adjacent terminals 10 in the upper row of the staggered pattern, which is within the range that wiring lines can be formed by normal micromachining. If the pitch x between adjacent terminals is smaller than 36 μm, micromachining is difficult.

Figure 8A:
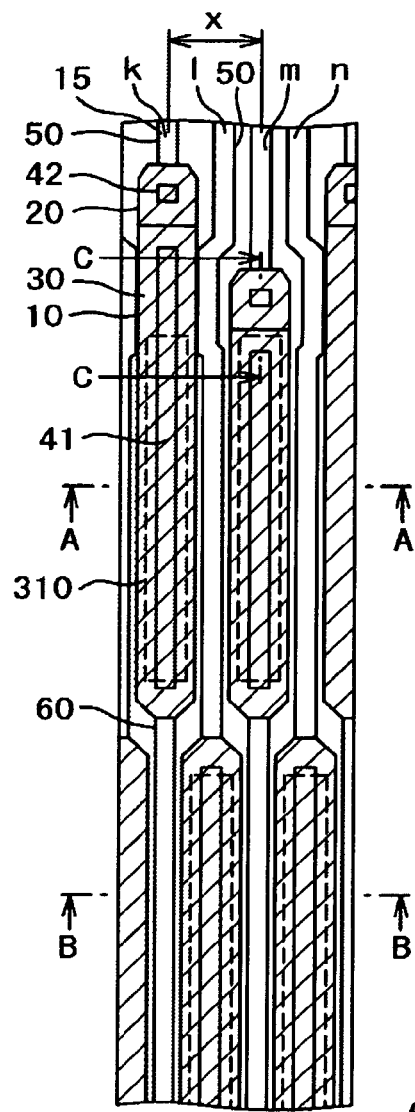
FIGS. 8A to 8D are diagrams illustrating another example of the terminal structure.
Figure 8B:
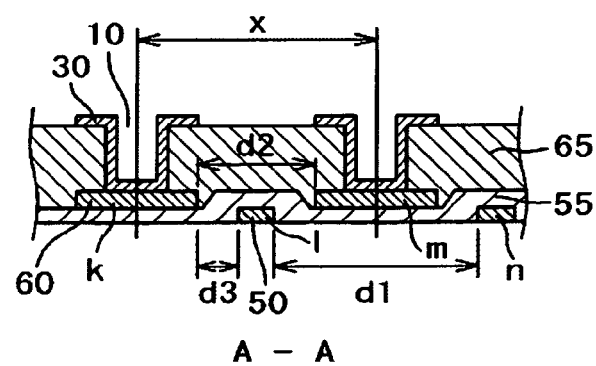
Figure 8C:
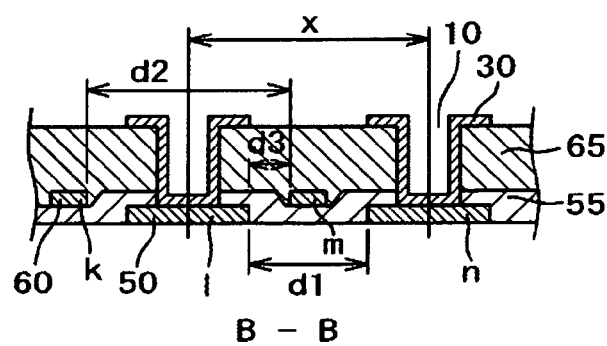
Figure 8D:
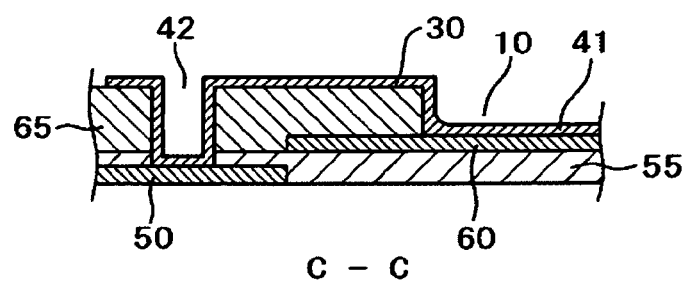

FIGS. 8A to 8D illustrate an example of a terminal part structure that is adapted for a wiring pitch smaller than 36 μm. FIG. 8A is a plan view of the terminal part. The display area is located above FIG. 8A and an end of the TFT substrate 100 is below FIG. 8A. FIG. 8B is a sectional view taken along the line A-A of FIG. 8A. FIG. 8C is a sectional view taken along the line B-B of FIG. 8A. FIG. 8D is a sectional view taken along the line C-C of FIG. 8A. A feature of the example of FIGS. 8A to 8D is that the terminal wiring lines 15 in the terminal part have a two-layer structure including the gate metal layer 50 and an SD metal layer 60. The SD metal layer 60 is named so because it uses the same metal as a layer that forms source/drain electrodes of the TFTs in the display area. The video signal lines are also formed from the SD metal layer 60. Al, for example, is employed for the SD metal layer 60. The gate metal layer 50 and the SD metal layer 60 are insulated from each other by the gate insulating film 55. Hatched regions of FIG. 8A represent the ITO film 30.

In FIG. 8A, terminal wiring lines k, l, m, and n are led out from the display area by the gate metal layer 50. The terminal wiring lines k and m switch over to the SD metal layer 60 through a wiring contact hole 42 before entering the terminal part. This structure is illustrated in FIG. 8D, which is a sectional view of the wiring line m taken along the line C-C of FIG. 8A.

In FIG. 8D, the gate metal layer 50 stretches from the display area and reaches past the wiring contact hole 42. The wiring contact hole 42 is formed in the gate insulating film 55 and the passivation film 65 to expose the gate metal layer 50. On the other side, where the terminal 10 is located, the terminal wiring line 15 (terminal wiring line m) is formed from the SD metal layer 60. A terminal contact hole 41 is formed in the passivation film 65 on the side of the terminal 10 to expose the SD metal layer 60 that serves as the terminal wiring line 15 (terminal wiring line m). The ITO film 30 covers the wiring contact hole 42 and the terminal contact hole 41 both, to thereby connect the gate metal layer 50 and the terminal 10 with each other. The terminal wiring line k has the same structure.

The terminal wiring line k and the terminal wiring line m thus use the SD metal layer 60 as a terminal wiring line of the terminal 10. The terminal wiring line l and the terminal wiring line n, on the other hand, use the gate metal layer 50 extended from the display area as a terminal wiring line of the terminal 10. To summarize, the wide terminal wiring line 15 (SD metal layer 60 in the case of the upper row of the staggered pattern, gate metal layer 50 in the case of the lower row) in the region where the terminal 10 is located and the narrow terminal wiring line 15 (gate metal layer 50 in the case of the upper row of the staggered pattern, SD metal layer 60 in the case of the lower row) running beside the terminal 10 are formed from different layers. This does not cause the resolution problem during light exposure since machining in the photolithography process is performed one layer at a time.

The thus formed terminal wiring lines are illustrated in FIG. 8B, which is a sectional view taken along the line A-A of FIG. 8A. In FIG. 8B, the terminal contact holes 41 connect the ITO film 30 and the SD metal layer 60. The narrow terminal wiring lines 15 running beside the wide terminal wiring lines 15 (SD metal layer 60) are formed from the gate metal layer 50. This provides more tolerance for micromachining than when terminal wiring lines for the terminals 10 are formed in the same layer. To take the example of FIG. 8B, the wiring interval in the gate metal layer 50, which is the first layer, is d1, the wiring interval in the SD metal layer 60, which is the second layer, is d2, and d1 and d2 are both larger than a wiring interval d3, which is the interval between wiring lines when all the terminal wiring lines 15 are placed on the same layer.

FIG. 8C is a sectional view taken along the line B-B of FIG. 8A, and illustrates another sectional structure of the terminal part. The terminal contact holes 41 of FIG. 8C connect the gate metal layer 50 and the ITO film 30. The narrow terminal wiring lines 15 running beside the wide terminal wiring lines 15 (gate metal layer 50) are formed from the SD metal layer 60. With the gate metal layer 50 and the SD metal layer 60 being separate layers, more tolerance is provided for the photo process, especially light exposure, than when terminal wiring lines are formed in the same layer. In FIG. 8C, the interval between wiring lines of the gate metal layer 50 is d1, the interval between wiring lines of the SD metal layer 60 is d2, and d1 and d2 are both larger than the interval d3, which is the interval between wiring lines when all the wiring lines are formed in the same layer.

The structure of FIGS. 8A to 8D can overcome the resolution problem in the step of exposing the terminal part to light, but requires wiring lines in the terminal part to have a two-layer structure without exception. Giving a wiring line a two-layer structure means that photomasks have to be positioned with respect to each other in the photo process. If masks for forming a two-layer wiring line shift from their correct positions, the gate metal layer 50 which is the first layer and the SD metal layer 60 which is the second layer may overlap. Then, if the press-fitting of the bumps 310 of the IC driver 300 damages the insulating film between the gate metal layer 50 and the SD metal layer 60, it risks contact between the two metal layers. The contact causes a short circuit between terminal wiring lines to which the same signal is applied (between the part of the terminal wiring line k that is formed from the gate metal layer 50 and the part of the terminal wiring line k that is formed from the SD metal layer 60) and a short circuit between terminal wiring lines to which different signals are applied (for example, between the terminal wiring line k and the terminal wiring line l). The former short circuit is not a problem but the latter short circuit is. For this reason, the film strength of the passivation film 65 of FIGS. 8A to 8D is in some cases enhanced by giving the passivation film 65 a two-layer structure. However, employing a two-layer structure for the passivation film 65 increases the number of manufacturing process steps.

Considering these problems, it would be better if wiring lines in the terminal part can be formed from one layer without its accompanying problem. The following embodiments illustrate structures in which wiring lines in the terminal part are formed from one layer while overcoming the resolution problem in light exposure.

First Embodiment

Figure 1A:
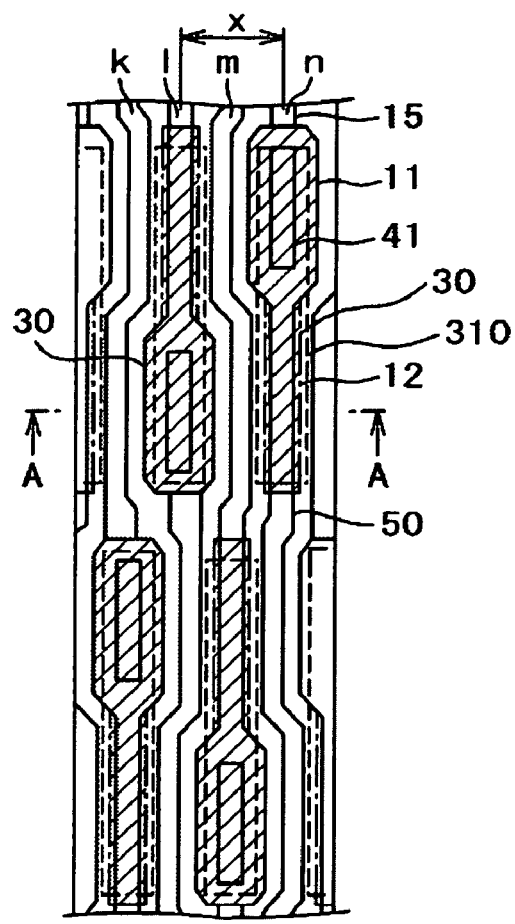
FIGS. 1A and 1B are diagrams illustrating a terminal structure according to a first embodiment.
Figure 1B:
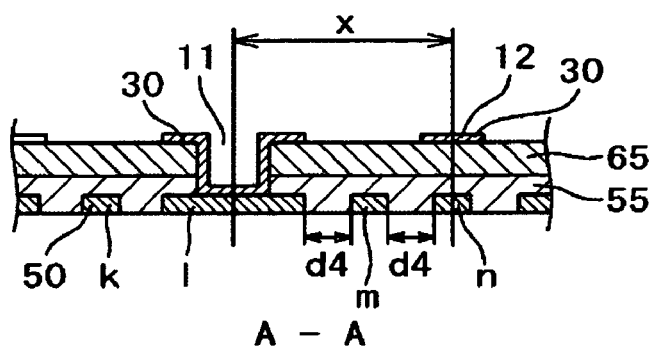

FIGS. 1A and 1B illustrate a first embodiment of the present invention. FIG. 1A is a plan view of the first embodiment. The display area is located above FIG. 1A and an end of the TFT substrate 100 is below FIG. 1A. FIG. 1B is a sectional view taken along the line A-A of FIG. 1A. In FIG. 1A, terminal wiring lines formed from the gate metal layer 50 stretch from the display area. The gate metal layer 50 in the terminal part is wide in some places and narrow in other places.

The terminal contact hole 41 is formed in the wide part of the gate metal layer 50. The gate metal layer 50 has to have a certain width to be able to form the terminal contact hole 41. The narrow part of the gate metal layer 50 in the terminal part, on the other hand, has no contact hole 41. With no contact hole 41, the gate metal layer 50 does not need to be wide.

A feature of this embodiment is that a single terminal 10 is divided into a first part 11 and a second part 12 to form in the first part 11 the terminal contact hole 41 through which the gate metal layer 50 and the ITO film 30 are connected. In the second part 12, no contact hole 41 is formed and the ITO film 30 alone is formed on the passivation film 65. The ITO film 30 in the second part 12 is used only for connection with the bumps 310 of the IC driver 300.

The ITO film 30 in the terminal part is represented by hatched regions in FIG. 1A. The ITO film 30 in the first part 11 has substantially the same contour as the gate metal layer 50, whereas the ITO film 30 in the second part 12 is indicated by the dot-dash line and is wider than the gate metal layer 50. However, the ITO film 30 in the second part 12 is not wider than the ITO film 30 in the first part 11.

Regions where the bumps 310 of the IC driver 300 are to be connected are indicated by the dotted lines in FIG. 1A. The bumps 310 of the IC driver 300 each have a width that is, in the first part 11, smaller than that of the ITO film 30 and, in the second part 12, slightly larger than that of the ITO film 30. Thus, while the terminal contact hole 41 has a reduced area, the area of contact between the bump 310 and the ITO film 30 is practically the same as in prior art and is large enough to ensure the bonding strength between the IC driver 300 and the terminals 10.

FIG. 1B is a sectional view taken along the line A-A of FIG. 1A. In FIG. 1B, all terminal wiring lines in the terminal part are formed in the same layer from the same material (gate metal layer 50), which means that adjacent terminal wiring lines are formed in the same layer. The gate metal layer 50 is wide in the first part 11 where the terminal contact hole 41 is formed and is narrower in the rest (which includes the second part 12) than in the first part 11. In FIG. 1B, the gate insulating film 55 is formed on the gate metal layer 50 and the passivation film 65 is formed on the gate insulating film 55. In a part of the films that corresponds to the location of the first part 11 of the terminal wiring line 1, the terminal contact hole 41 is formed to establish contact between the ITO film 30 and the gate metal layer 50. The terminal wiring line m runs to the right of the terminal wiring line l at a given distance from the terminal wiring line l. To the right of the terminal wiring line m, the second part 12 of the terminal wiring line n is located. The width of the gate metal 50 in the second part 12 of the terminal wiring line n is small and is the same as that of the terminal wiring line m. Above the terminal wiring line n, the ITO film 30 is formed with the gate insulating film 55 and the passivation film 65 interposed between the terminal wiring line n and the ITO film 30. This ITO film 30 is connected with the gate metal layer 50 through the terminal contact hole 41 that is formed in the first part 11 of the terminal wiring line n.

Since the gate metal layer 50 is narrow in the second part 12 of the terminal wiring line n, an interval d4 between wiring lines formed from the gate metal layer 50 can be set large enough for patterning by light exposure, despite all parts of a wiring line being formed from the gate metal layer 50 on the same plane.

The above is summarized with reference to FIG. 1A as follows:

In FIG. 1A, the gate metal layer 50 is wider in the first part 11 of the terminal wiring line l than in the second part 12 of the terminal wiring line l. The terminal wiring lines k and m, which are formed from the gate metal layer 50 in places adjacent to the terminal wiring line l, have a wiring width that is narrower in regions adjacent to the first part 11 of the terminal wiring line l than the wiring width of the terminal wiring line l in the first part 11. The terminal wiring lines k and m are also formed to bend outward away from the first part 11 of the terminal wiring line l. Forming the terminal wiring lines k and m to bend outward allows the interval between the wide first part 11 of the terminal wiring line l and the terminal wiring line k, or the terminal wiring line m, to be large enough for patterning by light exposure.

Bending the terminal wiring lines k and m outward reduces the distance from terminal wiring lines adjacently located on the opposite side to the terminal wiring line l. However, as illustrated in FIG. 1A where, for example, the terminal wiring line n adjacent to the terminal wiring line m is the terminal 10, no terminal contact hole 41 is formed in the bent part of the wiring line m. In short, this part of the terminal wiring line m has the structure of the second part 12 of the terminal 10. Moreover, the wiring width of the second part 12 of the terminal wiring line n where no contact hole 41 is formed is as narrow as the rest. The interval between the terminal wiring line n and the terminal wiring line m can therefore be set large enough for patterning by light exposure. This structure allows for wiring patterning by light exposure when the pitch x between the terminals 10 in FIGS. 1A and 1B is 34 μm or less.

In the embodiments of the present invention, each single terminal 10 includes the first part 11 and the second part 12, which is adjacent to the first part 11 in the running direction of the terminal wiring line.

Desirably, one bump 310 formed in the IC driver 300 is connected to both the first part 11 and second part 12 of one terminal 10 in an overlapping manner. This way, other areas than the display area can be made narrower.

A terminal group according to the embodiments of the present invention desirably includes, as illustrated in FIG. 1A, a terminal whose first part 11 is placed closer to the display area than the second part 12 is (for example, the terminal wiring line n fits this definition) and a terminal whose second part 12 is placed closer to the display area than the first part 11 is (for example, the terminal wiring line l fits this definition). This way, a large interval can be secured between terminal wiring lines all the time, including when the terminal 10 of the terminal wiring line l and the terminal 10 of the terminal wiring line n are to be connected to the bumps 310 of the same row.

Second Embodiment

A display device reduced in size and having an accordingly smaller framing area around the display area takes a structure in which lead-out lines of scanning lines, in particular, are gathered to one side of the display device. If all the lead-out lines of scanning lines are to be laid on a single plane in this case, a large area is needed. In order to avoid this problem, leading out the lead-out lines of scanning lines three dimensionally through an insulating layer requires less area for the lead-out lines of scanning lines. The scanning lines in this case are divided into ones that stretch to the terminal part through the gate metal layer 50 and ones that stretch to the terminal part through the SD metal layer 60. This embodiment is applicable to this and similar structures in which the wiring pitch of the terminal wiring lines 15 that are formed in different layers in the terminal part is small.

In the process of manufacturing a liquid crystal display device, the step of assembling a liquid crystal display panel includes checking for short circuit and other defects in wiring lines that are formed on the liquid crystal display panel before the IC driver 300 is installed in the liquid crystal display panel. A test TFT 110, a test wiring line 150, and other components used for the checking are formed in a region that is further outside of the terminal part, where the IC driver 300 is mounted, and that is close to an end of the TFT substrate 100. In liquid crystal display devices, a way to reduce the outside dimensions while securing a given display screen area is sought after. The region that is used only in the checking step is desirably as small as possible from the standpoint of reducing the outside dimensions of a liquid crystal display device.

Figure 2A:
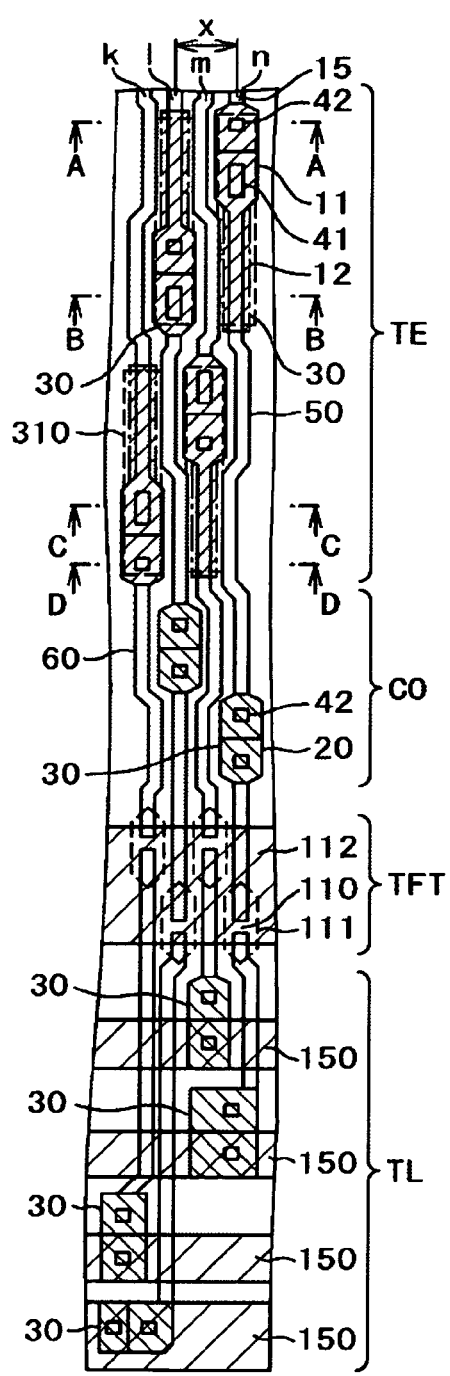
FIGS. 2A to 2E are diagrams illustrating a terminal structure according to a second embodiment.

The second embodiment describes with reference to FIGS. 2A to 2E a structure that can reduce the area of the test TFT 110 or the test wiring line 150 as well as reducing the wiring pitch in the terminal part. FIG. 2A is a plan view of this embodiment. The display area is located above FIG. 2A and an end of the TFT substrate 100 is below FIG. 2A. In FIG. 2A, an upper half region TE is the terminal part for connecting with the IC driver 300. Formed below the region TE in FIG. 2A is a region Co in which a switchover terminal 20 is formed to enable a wiring line to switch over from the gate metal layer 50 to the SD metal layer 60. Formed below the switchover terminal 20 in FIG. 2A is a region TFT for the test TFT 110. Below the region TFT in FIG. 2A, a region TL for the test wiring line 150 is formed.

A feature of the terminal part of this embodiment is that the interval between wiring lines is reduced by providing the terminal 10 from the first part 11 in which the terminal contact hole 41 is formed and the second part 12 in which no contact hole is opened and the ITO film 30 alone is formed, and by laying each terminal wiring line 15 in two layers. The wiring interval in this embodiment can therefore be made even smaller than in the first embodiment.

Figure 2B:
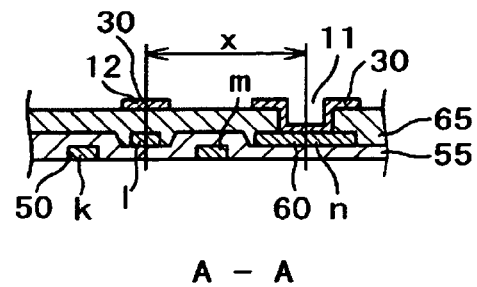
Figure 2C:
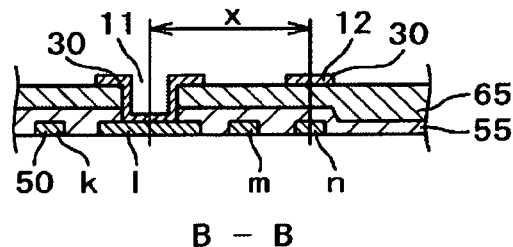
Figure 2D:
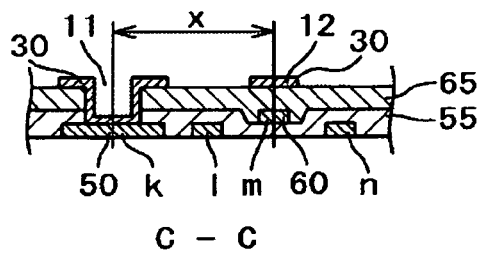
Figure 2E:
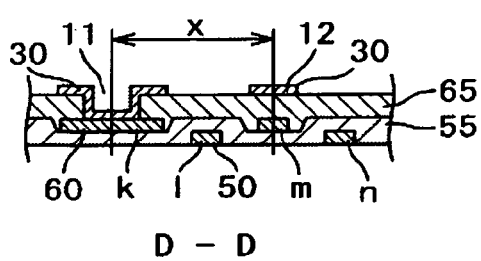

FIG. 2B is a sectional view taken along the line A-A of FIG. 2A. FIG. 2C is a sectional view taken along the line B-B of FIG. 2A. FIG. 2D is a sectional view taken along the line C-C of FIG. 2A. FIG. 2E is a sectional view taken along the line D-D of FIG. 2A. In the terminal wiring lines k and m of FIG. 2A, the gate metal layer 50 stretches from the display area. In the terminal wiring lines l and n, on the other hand, the SD metal layer 60 stretches from the display area. This two-layer wiring is employed in order that the lead-out lines of the scanning lines take up less area.

In FIG. 2A, the terminal wiring lines k and m stretch from the display area to the terminal part as the gate metal layer 50, whereas the terminal wiring lines l and n stretch from the display area to the terminal part as the SD metal layer 60. This is because the scanning lines in the terminal part are wired three-dimensionally in order to reduce the outside dimensions of the display device. The first point 11 and the second point 12 are formed in the terminal of each terminal wiring line 15 (terminal wiring line k, l, m, n) of FIG. 2A as in the first embodiment. The terminal contact hole 41 for connecting with the terminal wiring line is formed in the first part 11. In the second part 12, no contact hole is opened and the ITO film 30 alone is formed. In the terminal wiring lines k and m of FIG. 2A, the terminal contact hole 41 connects the SD metal layer 60 and the ITO film 30 to each other and, in the terminal wiring lines l and n, the terminal contact hole 41 connects the gate metal layer 50 and the ITO film 30 with each other.

A feature of this embodiment is that the wiring contact hole 42 is formed in the first part 11 for switchover from the gate metal layer 50 to the SD metal layer 60, or for switchover from the SD metal layer 60 to the gate metal layer 50. By switching over from the gate metal layer 50 and the SD metal layer 60, or vice versa, in the first part 11, the interval between wiring lines on the same layer can be set large.

FIG. 2B is a sectional view taken along the line A-A of FIG. 2A. In FIG. 2B, the terminal wiring line k and the terminal wiring line m are formed from the gate metal layer 50 whereas the terminal wiring line l and the terminal wiring line n are formed from the SD metal layer 60. The gate metal layer 50 and the SD metal layer 60 are insulated from each other by the gate insulating film 55. The second part 12 is formed in the terminal wiring line l. In other words, in the terminal wiring line l, the ITO film 30 of the terminal 10 is formed but contact holes such as the terminal contact hole 41 and the wiring contact hole 42 are not formed. In the terminal wiring line n, on the other hand, the wiring contact hole 42 is formed, which means that the terminal wiring line 15 switches over between the SD metal layer 60 and the gate metal layer 50 through the wiring contact hole 42, the ITO film 30, and the terminal contact hole 41 in the first part 11.

FIG. 2C is a sectional view taken along the line B-B of FIG. 2A. In FIG. 2C, all the terminal wiring lines are formed from the gate metal layer 50. In other words, the terminal wiring line l and the terminal wiring line n have both switched over from the SD metal layer 60 to the gate metal layer 50 through the wiring contact holes 42, the ITO film 30, and the terminal contact holes 41 in their respective first parts 11.

FIG. 2D is a sectional view taken along the line C-C of FIG. 2A. In FIG. 2D, the terminal contact hole 41 is formed in the terminal wiring line k, connecting the gate metal layer 50 and the ITO film 30 with each other. In the terminal wiring line m, the second part 12 is formed and the ITO film 30 is formed above the SD metal layer 60, with the passivation film 65 interposed between the ITO film 30 and the SD metal layer 60. The terminal wiring line m has already switched over from the gate metal layer 50 to the SD metal layer 60 in the first part 11. The other terminal wiring lines, l and n, are formed from the gate metal layer 50.

FIG. 2E is a sectional view taken along the line D-D of FIG. 2A. In FIG. 2E, the terminal wiring line k, too, has switched over from the gate metal layer 50 to the SD metal layer 60 through the wiring contact hole 42. The terminal wiring line m of FIG. 2E is formed from the SD metal layer 60, and has the ITO film 30 above the SD metal layer 60 with the passivation film 65 interposed between the ITO film 30 and the SD metal layer 60, thus forming the second part 12. The terminal wiring lines l and n are formed from the gate metal layer 50.

The basic structure of the first part 11 and the second part 12 in the second embodiment is the same as in the first embodiment, except that switchover in the second embodiment is performed between two terminal wiring lines that have two contact holes 41 and 42 in their respective first parts 11 and that are formed in different layers. For example, the first part 11 and the second part 12 of the second embodiment are the same as those of the first embodiment in that the terminal wiring line 15 is wider in the first part 11 than in the second part 12, and in that terminal wiring lines adjacent to one terminal wiring line bend outward in regions adjacent to the first part 11 of the one terminal wiring line. One bump 310 of the IC driver 300 is connected to the two contact holes 41 and 42 in the first part 11 and to the second part 12 in an overlapping manner. This way, an area necessary for the connection with the bump 310 is secured and switchover of wiring lines requires a minimum area.

The above concludes a description on the structure of the terminal part which is connected to the bumps 310 of the IC driver 300. Below the terminal part of FIG. 2A, the test TFT 110 is formed for each terminal wiring line 15. The test TFT 110 is usually kept turned off. When it is time for the testing, the test TFT 110 is turned on by setting a gate electrode 112 to the high level, to detect a short circuit between the terminals 10 and other defects.

The test TFT 110 includes the gate wiring line (gate electrode) 112, a semiconductor layer 111, which constitutes a channel, and a source/drain electrode 113. The SD metal layer 60 extended to the terminal part serves also as the source/drain electrode 113 (SD electrode 113) of the test TFT 110. In FIG. 2A, a shared, wide gate electrode 112 runs in the lateral direction across four test TFTs 110. The gate electrode 112 is drawn as a wide band in order to avoid complicating the drawing. In practice, the width of the gate electrode 112 at intersections with the SD metal layer 60 is set small as illustrated in FIG. 3 in order to reduce the capacitance between the gate electrode 112 and the SD electrodes 113.

Figure 3:
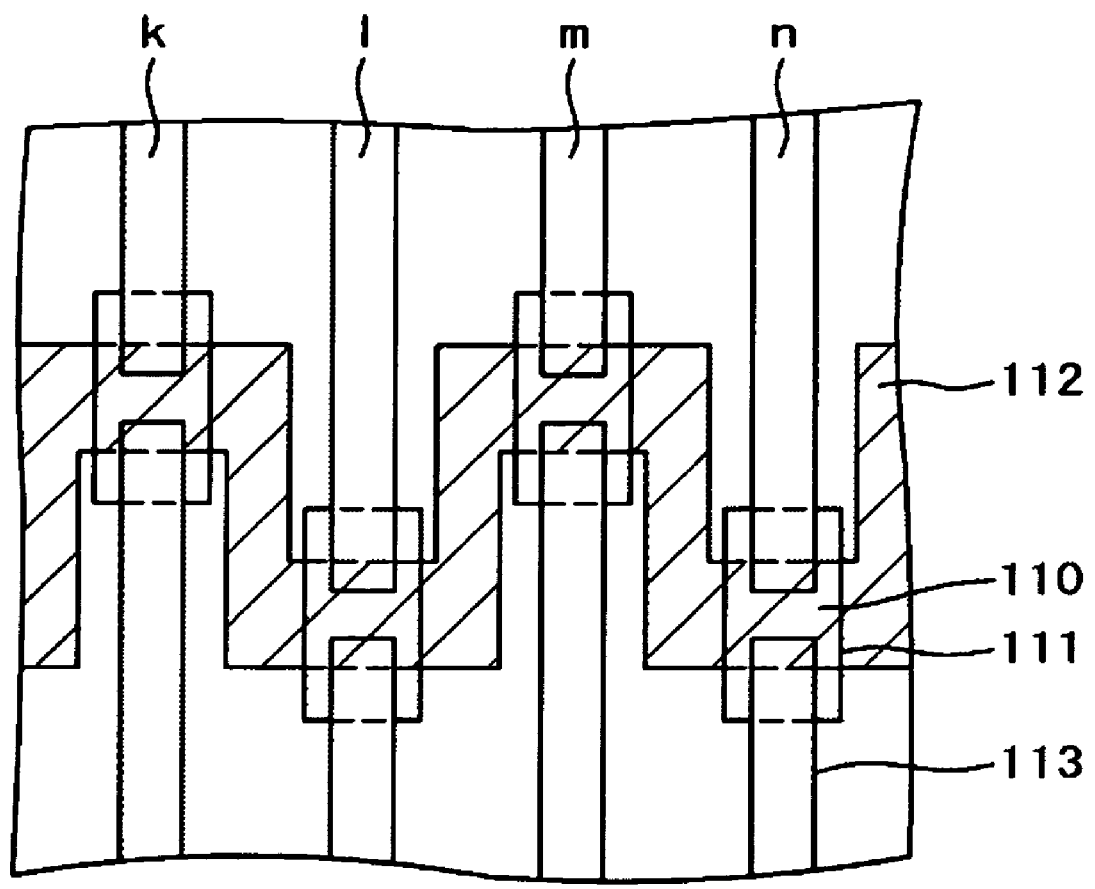
FIG. 3 is a plan view of a test TFT.

FIG. 3 is a schematic plan view in which the overlapping area of the gate wiring line 112 and the SD electrodes 113 in the test TFTs 110 of FIG. 2A is small. The terminal part is located above FIG. 3 and the test wiring part is below FIG. 3. In FIG. 3, the terminal wiring lines k, l, m, and n run from the direction of the terminal part. One test TFT 110 is formed for each terminal wiring line. Each test TFT 110 is constructed by forming the semiconductor layer (for example, a-Si layer) 111 above the bent gate wiring line 112 with the gate insulating film 55 interposed between the gate wiring line 112 and the semiconductor layer 111, and forming the SD electrode 113 on the semiconductor layer 111. The terminal wiring line 15 serves also as the SD electrode 113. As illustrated in FIG. 3; the gate wiring line 112 is bent to reduce the area of intersections with the SD electrodes 113. The capacitance between the gate wiring line 112 and the SD electrodes 113 is thus made small.

The test TFTs 110 are formed by the same process that is used to form TFTs within pixels. The source/drain electrodes of the test TFTs 110 therefore have to be formed from the SD metal layer 60. As illustrated in FIG. 2E, which is a sectional view taken along the line D-D of FIG. 2A, the terminal wiring lines k and m formed from the SD metal layer 60 can be used as the source/drain electrodes 113 of the test TFTs 110 as they are. The terminal wiring lines l and n, on the other hand, are formed from the gate metal layer 50 and need to switch over to the SD metal layer 60 in order to constitute the source/drain electrodes 113 of the test TFTs 110. A terminal for this switchover is the switchover terminal 20. The switchover terminal 20 has the same structure as that of the first part 11 of the terminal 10.

In FIG. 2A, there is no need to newly form the switchover terminal 20 for the terminal wiring lines k and m, where structures similar to the switchover terminal 20 have been formed in the first part 11 simultaneously. In short, according to the structure of this embodiment, only two switchover terminals 20 need to be formed instead of four switchover terminals 20, and hence the longitudinal dimension of FIG. 2A is made smaller by the lengths of two switchover terminals.

Below the test TFTs 110 in FIG. 2A, the test wiring line 150 which supplies signals used to check for short circuit and other wiring defects runs in the lateral direction. The test wiring line 150 is formed from the gate metal layer 50. A structure similar to the first part 11 or the switchover terminal 20 is used for switchover between the test wiring line 150 which is formed from the gate metal layer 50 and the source/drain electrode 113 of the test TFT 110 which is formed from the SD metal layer 60. In FIG. 2A, four test wiring lines 150 run in the lateral direction, which means that four systems of wiring lines can be checked for short circuit and other wiring defects. This embodiment employs two-layer wiring lines including the gate metal layer 50 and the SD metal layer 60 as wiring lines for the terminals 10, and therefore needs to check for short circuit between wiring lines of the same layer and between wiring lines of different layers. FIG. 2B illustrates how the check is conducted. In FIG. 2B, short circuit between wiring lines of the same layer is checked between the terminal wiring lines k and m and between the terminal wiring lines l and n, whereas short circuit between wiring lines of different layers is checked between the terminal wiring lines k and l, between the terminal wiring lines l and m, and between the terminal wiring lines m and n. By repeating this process, all the wiring lines can be checked. All terminal wiring lines can therefore be checked for short circuit and other defects with four test wiring lines 150.

The test wiring line 150 illustrated in FIG. 2A is formed from the gate metal layer 50 and has a constant width in the lateral direction. Similarly to the gate wiring line 120, the test wiring line 150 can be bent in order to reduce the capacitance between the test wiring line 150 and the terminal wiring lines 15 that are formed from the SD metal layer 60, whereby the area of intersections with the terminal wiring lines 15 is made smaller. The capacitance between the test wiring line 150 and the terminal wiring lines 15 can be reduced further if the a-Si layer 111, in addition to the gate insulating film 55, is formed between the test wiring line 150 formed from the gate metal layer 50 and the terminal wiring lines 15 that are formed from the SD metal layer 60.

The description given above is about a case of applying the present invention to terminals that supply signals to scanning lines, but the present invention is also applicable to terminals that supply signals to video signal lines. To check video signal lines, only three systems of test wiring lines 150 (one for R signals, one for G signals, and one for B signals, for example) are required.

As has been described, according to this embodiment, wiring lines can be laid at a small pitch by bending outward a wiring line on each side of the first part 11 in which the contact holes 41 and 42 are formed. This embodiment makes micromachining by light exposure possible even when the terminal pitch x illustrated in FIGS. 2A to 2E is 34 μm or less. Also, by laying wiring lines in two layers in the terminal part, more tolerance is provided for the reduction in wiring pitch. Further, forming the switchover terminal 20 in the first part 11 makes the region of the switchover terminal 20 for the test TFT 110 smaller, and reduces the size of the display device accordingly.

Third Embodiment

Figure 4A:
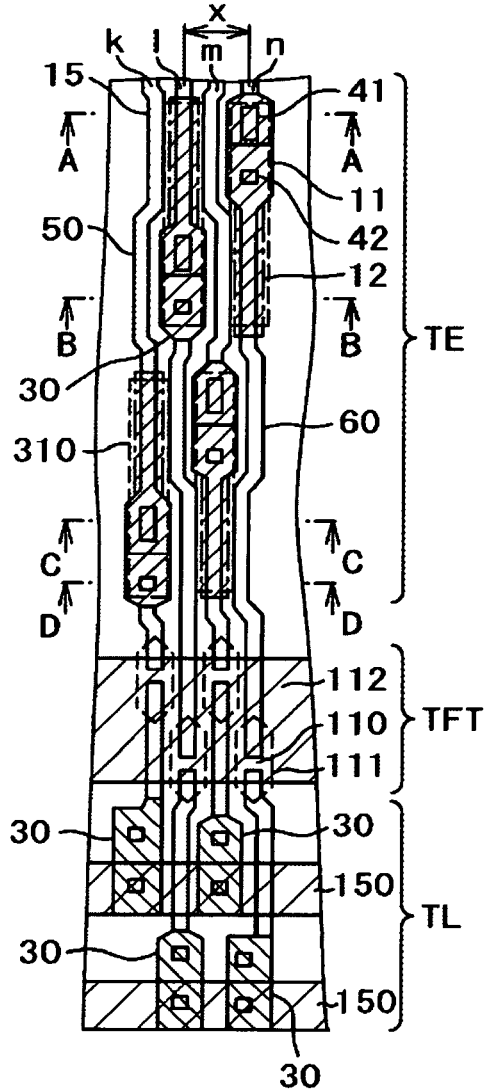
FIGS. 4A to 4E are diagrams illustrating a terminal structure according to a third embodiment.

FIGS. 4A to 4E illustrate a third embodiment of the present invention. FIG. 4A is a plan view. The display area is located above FIG. 4A and an end of the TFT substrate 100 is below FIG. 4A. In FIG. 4A, the upper half region TE is the terminal part for connecting with the IC driver 300. Formed below the region TE in FIG. 4A are the region TFT for the test TFT 110 and the region TL for the test wiring line 150.

This embodiment differs from the second embodiment in that all the terminal wiring lines 15 extended from the display area are formed from the gate metal layer 50. Forming the terminal wiring lines 15 all from the gate metal layer 50 does not hinder micromachining at a small wiring pitch as described in the first embodiment. As in the first embodiment, the connection terminals 10 which connect with the bumps 310 of the IC driver 300 each have the first part 11 where the terminal contact hole 41 is formed and the second part 12 where no contact hole is opened and the ITO film 30 alone is formed. The first part 11 has, as in the second embodiment, the wiring contact hole 42 for switchover from the gate metal layer 50 to the SD metal layer 60 in addition to the terminal contact hole 41. In this embodiment, every terminal wiring line 15 switches over from the gate metal layer 50 to the SD metal layer 60 in the first part 11 of the terminal 10.

In FIG. 4A, the test TFT 110 is formed below the region TE in which the terminal part is formed. To use the test wiring line 150 as the SD electrode 113 of the test TFT 110, the terminal wiring line 15 needs to be formed from the SD metal layer 60. The terminal wiring lines 15 of this embodiment all switch over from the gate metal layer 50 to the SD metal layer 60 in the terminal part, eliminating the need to form the switchover terminals 20 unlike the second embodiment. The outside dimensions of the display device can be reduced that much.

In FIG. 4A, the wide gate electrode 112 runs in the lateral direction to be shared by four test TFTs 110. The gate electrode 112 is drawn as a wide band in order to avoid complicating the drawing. In practice, the width of the gate electrode 112 at intersections with the SD metal layer 60 is set small in order to reduce the capacitance between the gate electrode 112 and the SD electrodes 113, as has been described in the second embodiment with reference to FIG. 3.

The test wiring line 150 is formed from the gate metal layer 50 below the test TFTs 110 in FIG. 4A. Two test wiring lines 150 run in this embodiment. All terminal wiring lines can be checked for short circuit with two systems of test wiring lines because the terminal wiring lines of this embodiment are all formed in the same layer, except for the terminal part in which switchover from the gate metal layer 50 to the SD metal layer 60 takes place.

Figure 4B:
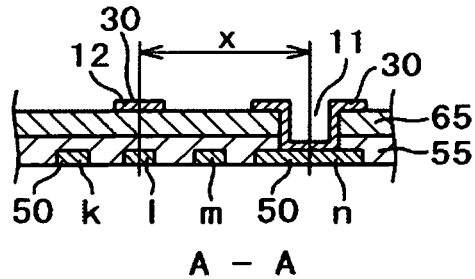

FIG. 4B is a sectional view taken along the line A-A of FIG. 4A. In this sectional view, all the terminal wiring lines are formed from the gate metal layer 50. FIG. 4B illustrates a sectional view before the terminal wiring line n switches over to the SD metal layer 60 through the ITO film 30 that covers a contact hole formed in the terminal part.

Figure 4C:
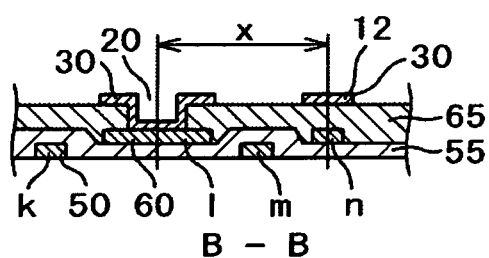

FIG. 4C is a sectional view taken along the line B-B of FIG. 4A. In this sectional view, the terminal wiring line n has finished switching over from the gate metal layer 50 to the SD metal layer 60 through the contact holes 41 and 42 and the ITO film 30 that are formed in the terminal part, whereas the terminal wiring line l is switching over through the contact hole 42 formed in the terminal part. The terminal wiring lines k and m are still formed from the gate metal layer 50.

Figure 4D:
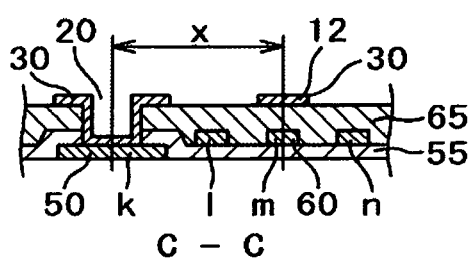

FIG. 4D is a sectional view taken along the line C-C of FIG. 4A. In FIG. 4D, the terminal wiring lines l, m, and n have already finished switching over from the gate metal layer 50 to the SD metal layer 60, whereas the terminal wiring line k is switching over from the gate metal layer 50 to the SD metal layer 60 through the terminal contact hole 41 and the ITO film 30 that are formed in the terminal part.

Figure 4E:
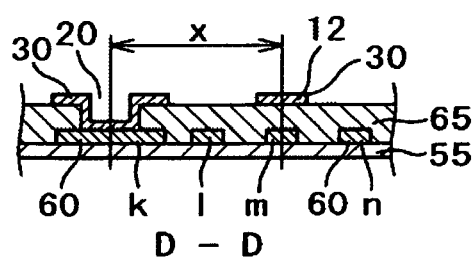

FIG. 4E is a sectional view taken along the line D-D of FIG. 4A. In FIG. 4D, the terminal wiring lines l, m, and n have already finished switching over from the gate metal layer 50 to the SD metal layer 60, whereas the terminal wiring line k has just switched over from the gate metal layer 50 to the SD metal layer 60 through the wiring contact hole 42 and the ITO film 30 that are formed in the terminal part.

As has been described, according to this embodiment, the wiring line interval can be set large by bending the terminal wiring lines 15, and the pitch x between terminals in the lateral direction of FIGS. 4A to 4E can therefore be reduced to 34 μm or less. Also, switching every terminal wiring line over from the gate metal layer 50 to the SD metal layer 60 in the terminal part eliminates the need to separately form the switchover terminal 20 for connecting the terminal wiring line to the test TFT 110, and is effective to the downsizing of a display device. Further, wiring lines for the terminals 10 of this embodiment are all formed in the same layer, and hence only two systems of the test wiring lines 150 are required, which is advantageous in simplifying the checking step and downsizing a display device. In the case where video signal lines are checked for defects, three systems of the test wiring lines 150 (for example, (one for R signals, one for G signals, and one for B signals) are desirably provided.

The above-mentioned description is about liquid crystal display devices. However, the present invention can be applied also to other types of display device such as organic EL display devices since the structure of the terminals 10 in other types of display device such as organic EL display devices is basically the same as in liquid crystal display devices.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
    a display area in which multiple scanning lines, multiple video signal lines, and multiple pixels are formed, the multiple video signal lines intersecting the multiple scanning lines; and
    a terminal group which is placed outside the display area,
    wherein the terminal group comprises multiple terminals each of which contains part of a terminal wiring line, the terminal wiring line supplying signals to any one of the multiple scanning lines and the multiple video signal lines,
    wherein the multiple terminals each comprise a first part and a second part, which is adjacent to the first part in a running direction of the terminal wiring line,
    wherein the first part comprises a contact hole, which is formed in an insulating film above the terminal wiring line, and a transparent conductive film, which covers the contact hole to connect to the terminal wiring line,
    wherein the second part comprises the transparent conductive film but not the contact hole,
    wherein the terminal wiring line is wider in the first part than in the second part, and
    wherein, in regions adjacent to the first part of one of the multiple terminals, terminal wiring lines of other terminals that are adjacent to the terminal wiring line of the one of the multiple terminals have a wiring width narrower than a width of the terminal wiring line of the one of the multiple terminals in the first part, and are bent away from the first part.

2. The display device according to claim 1, wherein one bump formed in an IC driver is connected to the first part of one of the multiple terminals, and to the second part of the one of the multiple terminals both in an overlapping manner.

3. The display device according to claim 1, wherein the terminal group comprises a terminal in which the first part is placed closer to the display area than the second part is and a terminal in which the second part is placed closer to the display area than the first part is.

4. The display device according to claim 1, wherein the terminal wiring line of the one of the multiple terminals and the terminal wiring lines of the other terminals that are adjacent to the terminal wiring line of the one of the multiple terminals are formed in the same layer.

5. The display device according to claim 1,
    wherein the multiple pixels formed in the display area each comprise a thin-film transistor, and
    wherein the terminal wiring line is formed from a gate metal layer, which is the same layer and material used to form a gate electrode of the thin-film transistor in the display area.

6. The display device according to claim 1, wherein the transparent conductive film of each of the multiple terminals is wider in the first part than in the second part.

7. A display device comprising:
    a display area in which multiple scanning lines, multiple video signal lines, and multiple pixels are formed, the multiple video signal lines intersecting the multiple scanning lines;
    a terminal group which is placed outside the display area;
    a test thin-film transistor which is connected to the terminal group; and
    a test wiring line,
    wherein the terminal group comprises multiple terminals each of which contains part of a terminal wiring line, the terminal wiring line supplying signals to any one of the multiple scanning lines and the multiple video signal lines,
    wherein the multiple terminals each comprise a first part and a second part, which is adjacent to the first part in a running direction of the terminal wiring line,
    wherein the terminal wiring line comprises a first terminal wiring line and a second terminal wiring line, which is formed in a layer different from a layer where the first terminal wiring line is formed,
    wherein the first part comprises a first contact hole, which is formed in an insulating film above the first terminal wiring line, a second contact hole, which is formed in an insulating film above the second terminal wiring line, and a transparent conductive film, which covers the first contact hole and the second contact hole to connect to the first terminal wiring line and the second terminal wiring line,
    wherein the second part comprises the transparent conductive film but not the first contact hole or the second contact hole,
    wherein the terminal wiring line is wider in the first part than in the second part,
    wherein, in regions adjacent to the first part of one of the multiple terminals, terminal wiring lines of other terminals that are adjacent to the terminal wiring line of the one of the multiple terminals have a wiring width narrower than a width of the terminal wiring line of the one of the multiple terminals in the first part, and are bent away from the first part,
    wherein, in the first part, the first terminal wiring line is electrically connected to the second terminal wiring line through the first contact hole, the second contact hole, and the transparent conductive film, and wherein the second terminal wiring line is connected to one of a source electrode and a drain electrode of the test thin-film transistor.

8. The display device according to claim 7, wherein one bump formed in an IC driver is connected to the first contact hole and the second contact hole in the first part of one of the multiple terminals, and to the second part of the one of the multiple terminals both in an overlapping manner.

9. The display device according to claim 7, wherein the terminal group comprises a terminal in which the first part is placed closer to the display area than the second part is and a terminal in which the second part is placed closer to the display area than the first part is.

10. The display device according to claim 7,
wherein the multiple pixels formed in the display area each comprise a thin-film transistor, and
wherein the first terminal wiring line is formed from a gate metal layer, which is the same layer and material used to form a gate electrode of the thin-film transistor in the display area.

11. The display device according to claim 10, wherein the second terminal wiring line is formed from an SD metal layer, which is the same layer and material used to form the source electrode and the drain electrode of the thin-film transistor in the display area.

12. The display device according to claim 11, wherein the terminal wiring line formed from the SD metal layer constitutes one of the source electrode and the drain electrode of the test thin-film transistor.

13. The display device according to claim 7, wherein the transparent conductive film of each of the multiple terminals is wider in the first part than in the second part.

14. A display device comprising:
a display area in which multiple scanning lines, multiple video signal lines, and multiple pixels are formed, the multiple video signal lines intersecting the multiple scanning lines;
a terminal group which is placed outside the display area;
a test thin-film transistor which is connected to the terminal group; and
a test wiring line,
wherein the terminal group comprises multiple terminals each of which contains part of a terminal wiring line, the terminal wiring line supplying signals to any one of the multiple scanning lines and the multiple video signal lines,
wherein the multiple terminals each comprise a first part and a second part, which is adjacent to the first part in a running direction of the terminal wiring line,
wherein the terminal wiring line comprises a first terminal wiring line and a second terminal wiring line, which is formed in a layer different from a layer where the first terminal wiring line is formed,
wherein the first part comprises a first contact hole, which is formed in an insulating film above the first terminal wiring line, a second contact hole, which is formed in an insulating film above the second terminal wiring line, and a transparent conductive film, which covers the first contact hole and the second contact hole to connect to the first terminal wiring line and the second terminal wiring line,
wherein the second part comprises the transparent conductive film but not the first contact hole or the second contact hole,
wherein the terminal wiring line is wider in the first part than in the second part,
wherein, in regions adjacent to the first part of one of the multiple terminals, terminal wiring lines of other terminals that are adjacent to the terminal wiring line of the one of the multiple terminals have a wiring width narrower than a width of the terminal wiring line of the one of the multiple terminals in the first part, and are bent away from the first part,
wherein, in the first part, the first terminal wiring line is electrically connected to the second terminal wiring line through the first contact hole, the second contact hole, and the transparent conductive film,
wherein every two adjacent terminal wiring lines are formed in different layers, which are separated by an insulating film, in a region between the terminal group and the display area,
wherein, when the first terminal wiring line of one terminal wiring line is located between the display area and the first part of one of the multiple terminals with which this terminal wiring line is associated, this terminal wiring line is electrically connected to the second terminal wiring line in the first part to be connected to one of a source electrode and a drain electrode of the test thin-film transistor, and
wherein, when the second terminal wiring line of one terminal wiring line is located between the display area and the first part of one of the multiple terminals with which this terminal wiring line is associated, this terminal wiring line is electrically connected to the first terminal wiring line in the first part, and is electrically connected back to the second terminal wiring line via a switchover terminal in a region between the first part and the test thin-film transistor to be connected to one of the source electrode and the drain electrode of the test thin-film transistor, the switchover terminal including a through hole.

15. The display device according to claim 14, wherein one bump formed in an IC driver is connected to the first contact hole and the second contact hole in the first part of one of the multiple terminals, and to the second part of the one of the multiple terminals both in an overlapping manner.

16. The display device according to claim 14, wherein the terminal group comprises a terminal in which the first part is placed closer to the display area than the second part is and a terminal in which the second part is placed closer to the display area than the first part is.

17. The display device according to claim 14,
wherein the multiple pixels formed in the display area each comprise a thin-film transistor,
wherein the first terminal wiring line is formed from a gate metal layer, which is the same layer and material used to form a gate electrode of the thin-film transistor in the display area, and
wherein the second terminal wiring line is formed from an SD metal layer, which is the same layer and material used to form the source electrode and the drain electrode of the thin-film transistor in the display area.

18. The display device according to claim 14, wherein a number of the switchover terminals is half a number of the terminal wiring lines.

* * * * *